United States Patent [19]
Fay

[11] Patent Number: 6,025,067
[45] Date of Patent: Feb. 15, 2000

[54] SOFT ELASTOMERIC COMPOSITE COMPOSITION

[76] Inventor: John Nicholas Fay, 1120 Boca Ciega Isle, St. Pete Beach, Fla. 33706

[21] Appl. No.: 08/873,843

[22] Filed: Jun. 14, 1997

Related U.S. Application Data

[63] Continuation-in-part of application No. 08/610,423, Mar. 4, 1996, abandoned, which is a continuation-in-part of application No. 08/400,837, Mar. 8, 1995, abandoned.

[51] Int. Cl.[7] ............................. B32B 5/18; B32B 27/08; B32B 27/32; B32B 27/40
[52] U.S. Cl. ..................... 428/314.4; 428/318.4; 428/319.3; 428/424.2; 428/424.8; 428/515; 428/517; 428/519; 525/92 C; 525/95; 525/96
[58] Field of Search .................... 428/304.4, 314.4, 428/317.1, 317.3, 317.7, 423.1, 319.3, 319.9, 320.2, 424.2, 424.8, 515, 519, 517; 525/92 C, 95, 96

[56] References Cited

U.S. PATENT DOCUMENTS

| | | | |
|---|---|---|---|
| 4,088,627 | 5/1978 | Gergen et al. | 260/42.18 |
| 4,107,131 | 8/1978 | Gergen et al. | 260/40 TN |
| 5,104,938 | 4/1992 | Toyama et al. | 525/92 |
| 5,262,468 | 11/1993 | Chen | 524/476 |
| 5,334,646 | 8/1994 | Chen | 524/474 |
| 5,336,708 | 8/1994 | Chen | 524/474 |
| 5,436,295 | 7/1995 | Nishikawa et al. | 525/92 C |
| 5,472,782 | 12/1995 | Naritomi | 428/412 |

*Primary Examiner*—Vivian Chen
*Attorney, Agent, or Firm*—Douglas Baldwin

[57] ABSTRACT

A composition comprising discrete particles of elastomeric triblock copolymer, the particles having a Shore A hardness of less than 30 suspended in a continuous phase matrix of noncellular elastomeric polyurethane polymer, in which the triblock copolymer has the configuration A-X-A in which block A is polystyrene and block X is a polymer of butadiene, isoprene or copolymer of ethylene and butylene; the final composition having a Shore A hardness of less than 20.

14 Claims, No Drawings

SOFT ELASTOMERIC COMPOSITE COMPOSITION

This Application is a continuation in part of application Ser. No. 08/610,423 filed Mar. 4, 1996, now abandoned, which is a continuation in part of pending Application 08/400,837 filed Mar. 8, 1995 now abandoned.

BACKGROUND OF THE INVENTION

This invention relates to a composition of thermoplastic elastomeric triblock polymer particles in a soft polyurethane matrix.

Elastomeric polymer compositions have a variety of uses. Very soft elastomeric polymers are of more restricted use but serve in a number of vital applications. Film and slabs of very soft elastomeric polymers are useful in certain cushioning applications, such as packaging of delicate parts, anti-vibration cushioning, and especially in prosthesis applications such as cushioning artificial limbs and other devices.

However, most elastomer compositions are formulated in a single phase and must have carefully tailored properties for any specific particular application. Also, single phase soft compositions tend to "bottom out" in use. That is, because of the softness—which can be as soft as the consistency of gelatin—the elastomer will move or flow from under a pressure point, leaving the pressure point unsupported and without cushioning. This can be a serious problem in some applications—leaving a delicate body part without adequate protection or a cushioned limb exposed to injury.

Triblock copolymer elastomers, such as the KRATON® elastomers from Shell Chemical Company, can be oil or plasticizer extended to obtain very soft compositions. However, they are single phase and when they contain excess oil they tend to "bleed". Very soft compositions of polyurethanes can be obtained, but they also tend to "bottom out" in use.

The present invention is a composite composition that will not "bottom out" and a method of making the composition.

SUMMARY OF THE INVENTION

This invention is a composition comprising discrete particles of elastomeric triblock copolymer having a Shore A hardness of less than about 30 in a continuous matrix of an elastomeric polyurethane polymer, the final composition having a Shore A hardness of less than about 20. The triblock copolymer polymer has the configuration A-X-A in which block A is polystyrene and block X is a polymer of butadiene or isoprene or a copolymer of ethylene and butylene. In one embodiment, the invention is a process for preparing a composition by (1) adding particles of a triblock copolymer into liquid polyurethane components and (2) mixing the particles and polyurethane components to achieve good mixture and to allow some liquid component to absorb into the X block of the triblock copolymer particles prior to curing. The polyurethane has, when cured, a Shore A hardness of less than about 20. In molded form the composition may be coated with a silicone or urethane coating. In one embodiment, the invention is a laminated structure comprising a polymer foam sheet adhered to a sheet of the composition described above. The invention is also a kit of components and a mold adapted for use together.

Other features and advantages will be apparent from the following description and from the claims.

DESCRIPTION OF THE PREFERRED EMBODIMENTS

Composition

Conventional elastomeric compositions such as polyurethane "bottom out" when pressed. That is, when compressed, the gel flows or moves from under the pressure leaving no cushion. The inclusion of discrete elastomeric particles in a continuous phase elastomeric polyurethane matrix can prevent such "bottoming out" under pressure if the particles are sufficiently fixed into the matrix and cannot move. If the particles are fixed in the matrix and cannot move, they provide the desired resilience. The composition of this invention accomplishes this by use of triblock copolymers that absorb some of a liquid prepolymer of a polyurethane composition, thereby bonding with the cured polyurethane matrix of a finished composition. This property is important in many applications. For example, in medical prosthetic use, where a film, sheet or pillow of elastomeric composition is used to cushion against shock, it is important that the cushioning be relatively uniform and stable.

The composition comprises discrete particles of soft triblock copolymer elastomer suspended in a soft polyurethane matrix. The matrix forms a continuous solid phase in which the particles are suspended. Thus, the particles form definable areas of different hardness and resilience from the suspending matrix. In general, the invention comprises a non-foamed non-cellular polyurethane matrix containing from about 5 to 80% and preferably about 20 to 60% by weight of particles of a soft triblock copolymer. The composition will have a Shore A hardness of less than about 20, and preferably between about 3 and 10, more preferably between 4 and 7. The particles of triblock copolymer and urethane may be of about the same softness, i.e., with a Shore A hardness of less than about 20, or in one embodiment they may be less soft than the polyurethane matrix.

In one embodiment, the particles are of greater hardness than the polyurethane matrix. For example, with a polyurethane of about 5 Shore A hardness, the particles may have a Shore A hardness of about 6 to 15. Such a differential hardness has advantages is certain applications. Thus, in this embodiment, the elastomeric matrix has a hardness of less than about 20, and the contained particles of triblock copolymer have a hardness of less than 30 Shore, but in any specific composition have a hardness of at least 1 Shore A unit greater than the polyurethane matrix, and preferably more than 3 Shore A hardness units greater than the polyurethane matrix.

The soft urethane elastomeric polymers have very good properties for application where toughness, flexibility, strength, abrasion resistance and shock-absorbing qualities are required. They are high in resistance to ozone, UV radiation, fuel oils and many chemicals. They are ideal for medical and prosthetic use since they are tough, tear resistant, washable, durable, bacterialstatic and fungistatic. Urethanes are carbamate esters made from a reaction of isocyanates and alcohols. Aromatic diisocyanate and elasticizing polyols (diols and triols) produce suitable polyurethanes.

Representative isocyanate materials include the diisocyanates and polyisocyanates. Specific materials include the aromatic diisocyanates such as 2,4-tolylene diisocyanate or diphenylmethane diisocyanate; polymethylene diisocyanates such as tetramethylene diisocyanate; and mixed isocyanate-isothiocyanate such as 1-isocyanate, 6-isothiocyanate hexane. Representaive polyisocyanates include toluene triisocyanate.

Representative hydroxyl-rich resins for reaction with the issocyanate material include the polyesters which are esterification products of a dicarboxylate acid and a polyhydric alcohol.

Suitable polyurethanes will have a Shore A hardness when cured of less than about 20 and preferably less than about 10. It is preferable to use a two-component polyurethane system in which one component is the isocyanate and the other is a curing catalyst and cross-linker. A very suitable system is available from Flexible Products Company under the trade name Flexipol, ME-50 (00). This system is self-curing and, when mixed at an ambient temperature, cures in about one hour.

The elastomeric triblock elastomer particles must be extremely soft and have a Shore A hardness of less than about 30 and preferably less than about 15. The particles are pellets, extrudates or screened crum. They are discrete particles of from about 0.1 to 10 mm in size but preferably from about 1 mm to 6 mm in size. Since they do not have to be of any particular shape or of consistent shape, the required size encompasses a wide general range of length or diameter. Thus, extruded particles may be 2 mm in diameter and 4 to 6 mm in length, or 5 mm in diameter and 2 mm in length. Sphere or generally spherical shapes may have diameters of 1 to 6 mm. It will be apparent that some variation in size and considerable latitude in shape will be suitable.

The triblock elastomers of the particles of this invention have a composition configuration of A-X-A in which A is a crystalline polymer end block segment of polystyrene and X is an elastomeric polymer center block segment of poly butadiene, poly isoprene or poly(ethylene-butylene). The center blocks and polystyrene portions are incompatible and form a two-phase system consisting of sub-micron domains of glassy polystyrene interconnected by flexible poly (ethylene-butylene) chains. These domains serve to crosslink and reinforce the structure. This physical elastomeric network structure is reversible, and heating the polymer above the softening point of polystyrene temporarily disrupts the structure. The structure can be restored by lowering the temperature. Most recent reviews of triblock copolymers are found in the article by Dr. Geoffrey Holden, "Thermoplastic Elastomers" in the ENCYCLOPEDIA OF CHEMICAL TECNOLOGY, Forth Edition, Volume 9, pages 15–37; John Wiley & Sons.

Readily available elastomeric triblock polymers known as KRATON® rubber and are available from Shell Chemical Company and Pecten Chemical Company. KRATON® D products have midblocks that are of unsaturated poly butadiene (S-B-S) or poly isoprene (S-I-S), and KRATON® G products have saturated midblocks of poly ethylene/butylene (S-EB-S). For the purposes of this invention, where very soft polymers are required, it is preferred that KRATON® polymers be extended with oils or plasticizers. The KRATON® 4000 series is oil extended. An extensive explanation of the various KRATON® polymers is given in the Shell Chemical brochure SC: 198-83 available from Shell Chemical Company and incorporated herein by reference. The ability of KRATON® rubbers to be oil extended to form gels is described in the Shell Chemical Technical Bulletin SC: 1102-89. It is an important aspect of this invention that these center blocks also absorb some of the liquid polyurethane prepolymer component.

Generally, the KRATON® (S-EB-S) rubbers, extended with oil, are preferred for the purposes of this invention. The KRATON® G 1600 series is especially suitable. These will have a broad range of styrene end block to ethylene and butylene center block ratios of approximately about 20:80 or less to about 40:60 or higher. Examples of high viscosity triblock copolymers that can be utilized to achieve one or more of the novel properties of the present invention are styrene-ethylene-butylene-styrene block copolymers (S-EB-S) available from Shell Chemical Company and Pecten Chemical Company (divisions of Shell Oil Company) under trade designations KRATON® G 1650, 1651 and 1652, KRATON® G 4600, KRATON® G 4609 and the like. Other grades of (S-EB-S) olymers may also be used.

Formulated triblock elastomers may also contain useful amounts of conventionally employed additives such as stabilizers, antioxidants, antiblocking agents, colorants, fragrances, flame retardants, other polymers in minor amounts and the like to an extent not affecting or substantially decreasing the desired properties of the present invention.

It is customary to also include a small amount of polypropylene, usually less than about 5% by weight, in soft oil extended KRATON® formulations. The presence of polypropylene can easily be determined by dissolving the polymer in toluene or xylene. If it all dissolves, there is no polypropylene. Since polypropylene is insoluble in these solvents, it will remain as a residue if present.

To obtain a suitably soft triblock polymer, the polymer is combined with selected oils. Suitable oils have an average molecular weight, preferably in the range of about 200 to about 700, as determined by ebulliscopic methods. Sufficient oil is added to obtain the desired softness of below about 30 Shore A hardness. As much as about 1,600 parts of oil per weight of polymer may be used. Suitable oils include rubber processing oil, such as paraffinic and naphthenic petroleum oils, highly refined aromatic-free paraffinic and naphthenic food and technical grade white petroleum mineral oils, and synthetic liquid oligomers of polybutene, polypropene, polyterpene, etc. The synthetic series process oils are high viscosity oligomers that are permanently fluid liquid nonolefins, isoparaffins or paraffins of moderate to high molecular weight. Many such oils are known and commercially available. Examples of representative commercial oils include Amoco Registered TM polybutenes, hydrogenated polybutenes and polybutenes with epoxide functionality at one end of the polybutene polymer. Examples of various commercial oils include ARCO Prime and Tufflo oils. Other white mineral oils include Bayol, Bernol, American, Blandol, Drakeol, Ervol, Gloria, Kaydol, Litetek, Marcol, Parol, Peneteck, Primol, Protol, Sontex, and the like.

Process for Producing the Composition

The process for preparing the composition of this invention will vary somewhat depending on the choice of the polyurethane used. It is preferred that polyurethane that cures at an ambient temperature be used. It is also preferred that the urethane be formulated as a two component system in which the components are low viscosity liquids. Low viscosity liquid components are especially desired since the liquid absorbs into the rubber block of the triblock elastomer to form an intimate and perhaps a chemical bond between the polyurethane and the triblock polymer. It is, therefore, essential that the triblock polymer particles be preformed before incorporation into the composition of this invention. Mixing uncured triblock particles with cured polyurethane will not give the desired bonding. Use of preformed and cured triblock polymer particles is required to allow one or more of the liquid polyurethane component to absorb into the triblock particles to effect a bond of the components. This bonding helps to set the particles in the composition to prevent "bottoming out". Therefore, it is necessary that the triblock polymer not be completely saturated with oil or plasticizer—no more than about 90% saturation as measured by the ability to absorb additional oil or plasticizer without significant "bleeding".

The components of the urethane are mixed in the required proportions, and the particles of triblock copolymer are mixed in. Mixing may be by any suitable method. In one embodiment, the patricles are placed in a mold and the liquid polyurethane poured over them and allowed to cure. This procedure provides adequate mixing to allow the liquid to be absorbed into the pellets and is useful to more precisely place the pellets in the prepared article. The polyurethane may contain a foaming agent or may otherwise be foamed so long as the foaming does not produce an open cell foam. The polyurethane is allowed to cure. When the polyurethane precursors are a two component system, the particles of triblock copolymer may be added to Component A (isocyanate) and mixed, and then Component B (the curing agent, i.e. an alcohol and optionally a crosslinking component) may be added and mixed. Conversely, the particles may be added to Component B, mixed and added to and mixed with Component A. The particles may be added to a mixture of A and B and mixed. Also as stated above the particles may be placed in the mold and the liquid polyurethane poured over them. The sequence of addition will depend to some extent upon the viscosity and absorption capability of the components. If one component of the urethane is more viscose or if one component more readily absorbs into the X portion of the triblock copolymer, then it is preferred that the particles be first added and mixed with that component.

The amount of particles is from about 10% by weight to about 90% by weight, and preferably from about 20 to 80% by weight and more preferably from about 30% to about 60% by weight. It is desired that the polyurethane be the continuous phase of the composition. Too small an amount of triblock polymer particles will result in a composition that does not have the "bottoming out" properties desired. Too much triblock copolymer particles are difficult to incorporate into the polyurethane matrix and can result in a composition having the triblock copolymer in the continuous phase.

If required, the composition can be cured at an elevated temperature, but ambient temperature curing is preferred for convenience and ease of formulation.

The composition may be cast. It is suitably molded in a closed or open mold to obtain any desired shape or in bulk. Bulk composition may be extruded or formed in any other conventional way suitable for thermoplastic compositions, such as extruded, injection molded, or RIM molded.

Suitable slabs or film will be of 3 mm to about 100 mm thickness and preferably between about 3 mm and 10 mm.

For some applications it may be desirable to coat the film or slab with other materials. Since the compositions of the invention can be tacky, coating will provide a smooth, non-tacky covering that is also water and oil repellent and durable. For example, for medical prosthetics use, it is desirable in some applications to coat the composition with a silicone coating. A silicone coating will prevent the devices from absorbing oil or perspiration from the skin of the user and will facilitate cleaning. It is generally suitable to dip the slab or molded component part in a liquid dispersion of a suitable silicone—such as is commonly used in medical coating applications. Such silicone coatings are usually air cured. Other coating such as urethane "paints" or coating have been suitably used. Such coating may be brushed or sprayed on the slabs of finished composition. In one embodiment the invention comprises a laminate of a sheet of the composition with other polymer closed cell foam materials, such as expanded crosslinked closed cell polyethylene. A number of polymer foams that have been found useful in prosthetic devises are suitable for this embodiment. In general, these foam materials are in the form of sheet material. Foams are manufactured by injection of air or augmenting a given material with chemical additives. Open cell foams have air chambers that communicate with each other as well as the material's surface. As such, fluids such as perspiration can flow through to permit evaporation and heat dissipation. In a closed cell foam, each air chamber is a separate, sealed sphere—cut off from each other and the material's surface. Since closed cell foams do not absorb or retain moisture, they often are employed as insulation.

The following are types of sheet foam materials that are useful.

Rubber foams, including closed cell neoprene.

Silicone polymer, a unique type of foam which, when mixed with cellulose and a blowing agent, produces a material that simultaneously expands and cures.

Closed cell Polyurethane Foam. Polyurethane foam is a thermoset material, generally non-heat moldable, that is often manufactured as an open or closed cell foam. Plastic Foams including Polyethylene Foam. Polyethylene (PE) foam is a synthetic material classified as a polyolefin, which is a thermoplastic. These foams are closed cell foams that are nontoxic, resistant to chemicals and fluids, light in weight, and, when heated to suitable temperatures, are moldable. A variety of PE foams are available in assorted durometers or hardnesses. Polyethylene foams are manufactured under different trade names, with each company implementing its own system to name the material's various durometers. Some of the more commonly encountered trade names of PE foams are Plastazote, Pelite, Evazote, AliPlast, and SOS (—a brand name given to Plastazote by a distributor). Plastazote foams are known for their memory or ability to retain moldable shape, as well as for their smooth, dry feel. They are generally categorized according to durometer and stiffness: soft, medium, firm, rigid, and hard and are available as perforated and non-perforated, in thicknesses ranging from $\frac{1}{16}$–1 inch and in three densities. AliPlast is a polyethylene foam, comparable to Plastazote, manufactured in four densities and available in a non-perforated form only. Evazote, available in one density, is extremely self-accommodating and lightweight. Pelite, commonly used as a liner for prosthetics, is available in four durometers.

Polyvinyl Chlorides (PC), such as Dynafoam, a polyvinyl chloride foam compound. The material is closed cell, thermosetting, odorless, and water resistant.

Other polyvinyl chloride foams such as Benefoam, Biofoam, Castofoam, and Foamart can be used. PLASTAZOTE®, a sheet polyethylene product from Zotefoams, Inc. in Hackettstown, N.J. is an especially suitable material. PELITE® is also suitable.

The laminate of the invention is made by adhering a sheet of the particle containing polyurethane to a sheet of the closed cell foam. This may be accomplished by gluing the two finished sheets together but is more suitably formed in situ. For example, a sheet of the closed cell foam may be placed in a mold and a mixture of uncured polyurethane ant elastomer particles poured over it. When cured the sheets adhere. It has been found that better adherence is obtained if the closed cell sheet is roughened (as with sandpaper) and coated with a urethane coating prior to pouring on the polyurethane mixture. It is also suitable to place elastomer particles on a sheet of closed cell foam material and pour in the uncured polyurethane mixture. Again, roughing the surface of the closed cell sheet and coating with a urethane paint improves adhesion.

The invention is further illustrated by means of the following illustrative embodiment, which is given for purposes of illustration only and is not meant to limit the invention to the particular components and amounts disclosed.

Specific Embodiment

A composition according to the invention was made by pouring into a closed mold (sized to produce a slab of about 5 mm thickness) the following:

1 pound (454 grams) Flexipol ME-50 Component A;
2 pounds (908 grams) of Flexipol Component B; and
1 pound of Dynaflex GX-6705 extrudate cylindrical pellets of about 2 mm diameter and 3 mm length.

The mixture was stirred gently to prevent incorporation of air, and the mold closed. It was cured in about one hour at an ambient temperature. The composition was soft, with a Shore A hardness of about 5 and suitable for use as a prosthetic cushion. The composition was pigmented with blue coloring. The resulting composition is an opaque light blue color in which can be seen discrete particles of Dynaflex® GX-6705.

Dynaflex® GX-6705-001 is a product available from GLS Plastics of 740 B Industrial Drive, Cary Ill. 60013. It contains KRATON® and has the following properties:

| | |
|---|---|
| Hardness, Shore A (ASTM D-2240) | 5 |
| Specific gravity (ASTM D-792) | 9 |
| 300% modulus, PSI (ASTM D-412) | 45 |
| Tensile strength, PSI (ASTM D-412 | 240 |
| Elongation, at Break (%) | 1840 |
| Melt Flow (200° C. 1200 grams) (ASTM D-1238) | 23.4 |

Flexipol ME-50 (00) is a two component product of Flexible Products Company.

Component A contains isocyanate and has a specific gravity of 10 to 10.5 and a viscosity of 600 to 800 cps.

Component B contains a cross-linker, catalyst and blowing agent and has a specific gravity of 8.5 to 8.65 and a viscosity of 1000 to 1500 cps.

In one embodiment, the invention is a kit in which a pre-selected amount of the composition components are adapted to and packaged with, or for use in, a specific mold. For example, sufficient polyurethane components of the preferred hardness, together with sufficient particles of triblock copolymer, are provided with a closed mold for making a wheelchair cushion. Similarly, a predetermined amount of triblock copolymer particles and urethane components are adapted for use in, and provided for use in, a closed mold for making foot products such as shoe inserts. The predetermined amount is determined by the amount of the total composition need to fill the mold of the desired application. For example, an excess amount of the uncured composition can be made and weighted. After filling the mold the excess is weighted. By subtracting the excess from the original amount the difference is the predetermined amount for that application. Thus, the manufacturer can order and store pre-measured cushion components for making cushions without the necessity of keeping a large inventory of cushions. Moreover, such a system works ideally with a "just in time" inventory system in which parts are computer counted and replacement prepackaged components are ordered just in time for meeting order demand. This system works especially well for small custom manufacturers of prosthesis parts. Composition component packages are produced to match the most common size mold for specific prosthetic devices.

Typical Uses

The compositions of the present invention are especially useful as film or slab cushioning materials in medical and sports health care, such as crutch cushions, cervical pillows, bed wedge pillows, leg rests, neck cushions, mattresses, bed pads, elbow padding, dermal pads, wheelchair cushions, helmet liners, cold and hot packs, exercise weight belts, traction pads and belts, cushions for splints, slings, and braces (for the hand, wrist, finger, forearm, knee, leg, clavicle, shoulder, foot, ankle, neck, back, rib, etc.), heel cushions, and also soles for orthopedic shoes. They can be formed into any desired shape and are especially useful in cushioning liners for limb prosthesis application. For example, the composition can be formed into custom shapes to fit individual prosthetic devices to provide a sanitary, washable cushion between the limb and prosthetic device. Likewise, a wheelchair cushion can be made from the composition in almost any shape so long as it meets the needs of the user of the cushion. The same applies for brace cushions for the hand, wrist, finger, forearm, knee, leg, etc.

The compositions are also useful in low frequency vibration applications, such as cushioning elastic layers in constrained-layer damping of mechanical structures and goods; as layers used in laminates for isolation of acoustical and mechanical noise; as antivibration elastic support for transporting shock sensitive loads; as vibration isolators for an optical table; as viscoelastic layers used in wrappings, enclosures and linings to control sound; and as compositions for use in shock and dielectric encapsulation of optical, electrical and electronic components. The components are also useful as molded shape articles for use.

These representative embodiments are illustrative of the invention, but other modifications and variations are within the scope of the following claims.

What is claimed is:

1. A composition comprising discrete particles of elastomeric triblock copolymer, the particles having a Shore A hardness of less than 30 suspended in a continuous phase matrix of noncellular elastomeric polyurethane polymer, in which the triblock copolymer has the configuration A-X-A in which block A is polystyrene and block X is a polymer of butadiene, isoprene or copolymer of ethylene and butylene; the final composition having a Shore A hardness of less than 20.

2. The composition of claim 1 in which the particles of triblock copolymer are of a size of about 0.1 to 10 mm and comprise 10 to 80% by weight of the composition and have a Shore A hardness of less than about 15, and the elastomeric polyurethane has a Shore A hardness of less than about 10.

3. The composition of claim 2 in which the amount of particles of triblock copolymer have a shore A hardness at least 1 unit greater that that of the continuous phase polyurethane matrix.

4. The composition of claim 3 in which the amount of particles is from about 30 to about 55 percent by weight based on the total weight of the composition.

5. The composition of claim 2 in which the composition is formed into an article, a film or slab and is coated with a silicone coating from a dispersion of silicone rubber or a urethane coating.

6. The composition of claim 5 in which the composition is formed into an article, film or slab, is coated with a silicone coating from a dispersion of silicone rubber or a urethane coating and is adhered to a sheet of closed cell foam material.

7. The composition of claim 6 in which the composition is formed into an article, film or slab, is coated with a silicone coating from a dispersion of silicone rubber or a urethane coating and is adhered to a preformed sheet of a cross linked polyethylene by curing the particle containing polyurethane mixture in contact with a preformed sheet.

8. The composition of claim 1 in which the particles are an S-EB-S triblock copolymer in which S is polystyrene blocks and EB is a rubbery polymer block of ethylene and butylene.

9. The composition of claim 1 in which the particles of triblock copolymer are of a size of about 1 to 6 mm and comprise about 20 to about 60 percent by weight based on the total weight of the composition.

10. The composition of claim 9 in which the amount of particles is from about 30 to about 60 percent by weight based on the total weight of the composition.

11. The composition of claim 9 in which the amount of particles is from about 30 to about 55 percent by weight and the particles are harder than the polyurethane by at least 1 Shore A unit.

12. The composition of claim 11 in which the particles are harder than the polyurethane by at least 3 Shore A units.

13. A kit comprising components 1) and 2) wherein component 1) is a triblock copolymer particles wherein the copolymer has the configuration A-X-A in which block A is polystyrene and block X is a polymer of butadiene, isoprene or copolymer of ethylene and butylene, and which said triblock copolymer has a Shore A hardness of less than about 30 and component 2) is a polyurethane which has a Shore A hardness of less than about 20; each component 1) and 2) being present in an amount sufficient to form a molded composition having discrete particles of component 1) in a noncellular continuous phase matrix of component 2) wherein said molded composition has a Shore A hardness of less than 20 and wherein the said composition is sufficient for a single use in a mold.

14. The kit of claim 13 in which component 1) is particles of 0.1 to 10 mm in size and present in an amount sufficient to form 20 to 80% of the total weight of the total composition.

\* \* \* \* \*